(12) United States Patent
Borges et al.

(10) Patent No.: US 11,175,905 B2
(45) Date of Patent: Nov. 16, 2021

(54) OPTIMIZING UPLOADS FOR AN OFFLINE SCENARIO BY MERGING MODIFICATION OPERATIONS

(71) Applicant: SAP SE, Walldorf (DE)

(72) Inventors: Matt Borges, Kitchener (CA); David Brandow, Guelph (CA); Michael Thode, Waterloo (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/586,222

(22) Filed: Sep. 27, 2019

(65) Prior Publication Data
US 2021/0096842 A1 Apr. 1, 2021

(51) Int. Cl.
*G06F 8/656* (2018.01)

(52) U.S. Cl.
CPC .................. *G06F 8/656* (2018.02)

(58) Field of Classification Search
CPC ...... G06F 11/2056; G06F 40/197; G06F 8/65; G06F 8/656
See application file for complete search history.

(56) References Cited

U.S. PATENT DOCUMENTS

| | | | |
|---|---|---|---|
| 7,249,118 B2 | 7/2007 | Sandler et al. | |
| 9,509,769 B2 | 11/2016 | Hurst et al. | |
| 10,169,121 B2 | 1/2019 | Vibhor et al. | |
| 10,311,082 B2 | 6/2019 | Ritter et al. | |
| 2002/0087504 A1* | 7/2002 | Thompson | G06F 16/2308 |
| 2008/0172660 A1* | 7/2008 | Arning | G06F 8/33 717/144 |
| 2009/0210459 A1* | 8/2009 | Nair | G06F 16/954 |
| 2015/0106790 A1* | 4/2015 | Bigwood | G06F 11/3624 717/127 |
| 2015/0346713 A1* | 12/2015 | Gerber | G05B 19/418 700/96 |
| 2017/0177687 A1 | 6/2017 | Ritter et al. | |
| 2017/0177696 A1* | 6/2017 | Biesemann | H04L 7/0008 |

(Continued)

OTHER PUBLICATIONS

Giroux, M.A., "Backend For Frontends, Optimized Server Adapters, and GraphQL," from https://medium.com/@__xuorig__/backend-for-frontends-optimized-server-adapters-and-graphql-eb7c0c591c82, 4 pages, Nov. 2, 2018.

(Continued)

*Primary Examiner* — Wei Y Zhen
*Assistant Examiner* — Amir Soltanzadeh
(74) *Attorney, Agent, or Firm* — Sterne, Kessler, Goldstein & Fox P.L.L.C.

(57) ABSTRACT

Disclosed herein are system, method, and device embodiments for optimizing uploads for an offline scenario by merging requests. An embodiment operates by performing a plurality of modification operations over application storage, generating a first queue entry within a normal operations queue corresponding to a first modification operation of the plurality of modification operations, generating a second queue entry corresponding to a second modification operation of the plurality of modification operations, generating an optimized operations queue including an optimized queue entry combining the first queue entry and the second queue entry, and synchronizing the application storage with a remote storage system based on the optimized operations queue.

22 Claims, 12 Drawing Sheets

(56) References Cited

U.S. PATENT DOCUMENTS

2019/0354540 A1\* 11/2019 Stigsen ................ G06F 16/275
2020/0104309 A1    4/2020 Borges et al.
2020/0117445 A1\*  4/2020 Wilson ................... G06F 30/13

OTHER PUBLICATIONS

"Synchronize Offline Changes with SmartSync Data Framework," from https://trailhead.salesforce.com/en/content/learn/modules/mobile_sdk_offline/mobilesdk_offline_smartsync, 29 pages, printed Jul. 4, 2019.

\* cited by examiner

Operations Queue 200

| ID | Operation | Body |
|---|---|---|
| 1 | POST Customers | ID=1, GivenName=Jon, Surname=Smith |
| 2 | PATCH Customers(1) | Surname=Doe |
| 3 | DELETE Customers(1) | |

Operations Entries 202(1)-(3); columns 203(1), 203(2), 203(3)

FIG. 2A

Operations Queue 200

| ID | Operation | Body |
|---|---|---|
| *Empty* | *Empty* | *Empty* | columns 203(1), 203(2), 203(3)

FIG. 2B

Operations Queue 204

| ID | Operation | Body |
|---|---|---|
| 1 | POST Customers | ID=1, GivenName=Jon, Surname=Smith |
| 2 | PATCH Customers(1) | Surname=Doe |
| 3 | PATCH Customers(1) | City=Kitchener, Province=Ontario |

Operations Entries 206(1)-(3); columns 207(1), 207(2), 207(3)

FIG. 2C

Operations Queue 204

| ID | Operation | Body |
|---|---|---|
| 1 | POST Customers | ID=1, GivenName=Jon, Surname=Doe, City=Kitchener, Province=Ontario |

Operations Entry 206(1); columns 207(1), 207(2), 207(3)

FIG. 2D

Operations Queue 208

| ID | Operation | Body |
|---|---|---|
| 1 | POST Customers | ID=1, GivenName=Jon, Surname=Smith |
| 2 | POST Customers | ID=2, GivenName=Jane |
| 3 | PATCH Customers(1) | Surname=Doe |
| 4 | PATCH Customers(1) | City=Kitchener, Province=Ontario |
| 5 | PATCH Customers(3) | City=Cambridge |
| 6 | PATCH Customers(2) | Surname=Deaux |
| 7 | PATCH Customers(4) | Province=Manitoba |
| 8 | PATCH Customers(3) | Province=Ontario |

211(1), 211(2), 211(3) — column headers ID, Operation, Body
Operations Entries 210(1)-(8)

FIG. 2E

Operations Queue 208

| ID | Operation | Body |
|---|---|---|
| 1 | POST Customers | ID=1, GivenName=Jon, Surname=Doe, City=Kitchener, Province=Ontario |
| 2 | POST Customers | ID=2, GivenName=Jane, Surname=Deaux |
| 5 | PATCH Customers(3) | City=Cambridge, Province=Ontario |
| 7 | PATCH Customers(4) | Province=Manitoba |

Operations Entry 210(1)
Operations Entry 210(2)
Operations Entry 210(5)
Operations Entry 210(7)

FIG. 2F

Operations Queue 212

| | ID | Operation | Body | Batch ID | Change Set ID |
|---|---|---|---|---|---|
| | 215(1) | 215(2) | 215(3) | 215(4) | 215(5) |
| Operations Entries 214(1)-(6) | 1 | POST Customer | ID=1, GivenName=Jon, Surname=Smith | NULL | NULL |
| | 2 | POST Customers | ID=2, GivenName=Jane | NULL | NULL |
| | 3 | PATCH Customers(1) | Surname=Doe | 1 | 1 |
| | 4 | PATCH Customers(1) | GivenName=Jonathan | 1 | 1 |
| | 5 | PATCH Customers(2) | Surname=Deaux, City=Guelph | NULL | NULL |
| | 6 | PATCH Customers(1) | City=Kitchener | NULL | NULL |

FIG. 2G

Operations Queue 212

| | ID | Operation | Body | Batch ID | Change Set ID |
|---|---|---|---|---|---|
| | 215(1) | 215(2) | 215(3) | 215(4) | 215(5) |
| Operations Entry 214(1) | 1 | POST Customer | ID=1, GivenName=Jon, Surname=Doe | NULL | NULL |
| Operations Entry 214(2) | 2 | POST Customers | ID=2, GivenName=Jane, Surname=Deaux, City=Guelph | NULL | NULL |
| Operations Entry 214(3) | 3 | PATCH Customers(1) | Surname=Doe, GivenName=Jonathan | 1 | 1 |
| Operations Entry 214(6) | 6 | PATCH Customers(1) | City=Kitchener | NULL | NULL |

FIG. 2H

Operations Queue 216

| | ID | Operation | Body | Non-Modifiable |
|---|---|---|---|---|
| | 219(1) | 219(2) | 219(3) | 219(4) |
| Operations Entries 218(1)-(6) | 1 | POST BCP | ID=1, State=NEW, Description=Some Problem | True |
| | 2 | PATCH BCP(1) | Description=More detailed description | False |
| | 3 | PATCH BCP(1) | Description=Even more detailed description | False |
| | 4 | PATCH BCP(1) | State=IN PROCESS | True |
| | 5 | PATCH BCP(1) | Internal Description=Identified Bug Description | False |
| | 6 | PATCH BCP(1) | Internal Description=More details about the bug | False |

FIG. 2I

Operations Queue 216

| | ID | Operation | Body | Non-Modifiable |
|---|---|---|---|---|
| | 219(1) | 219(2) | 219(3) | 219(4) |
| Operations Entry 218(1) | 1 | POST BCP | ID=1, State=NEW, Description=Some Problem | True |
| Operations Entry 218(2) | 2 | PATCH BCP(1) | Description=Even more detailed description | False |
| Operations Entry 218(4) | 4 | PATCH BCP(1) | State=IN PROCESS | True |
| Operations Entry 218(5) | 5 | PATCH BCP(1) | Internal Description=More details about the bug | False |

FIG. 2J

Operations Queue 220

| ID (223(1)) | Operation (223(2)) | Body (223(3)) |
|---|---|---|
| 1 | POST Order | ID=1, Quantity=5, Product=Products(1) |
| 2 | PATCH Order(1) | Quantity=10 |
| 3 | PATCH Order(1) | Product=Products(2) |

Operations Entries 222(1)-(3)

FIG. 2K

Operations Queue 220

| ID (223(1)) | Operation (223(2)) | Body (223(3)) |
|---|---|---|
| 1 | POST Order | ID=1, Quantity=10, Product=Products(2) |

Operations Entry 222(1)

FIG. 2L

Operations Queue 224

227(1)  227(2)  227(3)

| ID | Operation | Body |
|---|---|---|
| 1 | PATCH Cars(1) | Parts=Parts(1) |
| 2 | PATCH Cars(1) | Parts=Parts(2) |
| 3 | POST Parts | ID=3,Description=New Tire |
| 4 | PATCH Cars(1) | Parts=Parts(3) |

Operations Entries 226(1)-(4)

FIG. 2M

Operations Queue 224

227(1)  227(2)  227(3)

| ID | Operation | Body |
|---|---|---|
| 1 | PATCH Cars(1) | Parts=Parts(1),Parts=Parts(2) |
| 3 | POST Parts | ID=3,Description=New Tire |
| 4 | PATCH Cars(1) | Parts=Parts(3) |

Operations Entry 226(1)
Operations Entry 226(3)
Operations Entry 226(4)

FIG. 2N

| | | | | Operations Queue 228 |
|---|---|---|---|---|
| | 231(1) | 231(2) | 231(3) | |
| | ID | Operation | Body | |
| | 1 | PATCH Cars(1) | Parts=Parts(1) | |
| Operations Entries 230(1)-(4) | 2 | PATCH Cars(1) | Parts=Parts(2) | |
| | 3 | DELETE relationship between Cars(1) and Parts(2) | | |
| | 4 | PATCH Cars(1) | Parts=Parts(3) | |

FIG. 2O

| | | | | Operations Queue 228 |
|---|---|---|---|---|
| | 231(1) | 231(2) | 231(3) | |
| Operations Entry 230(1) | ID | Operation | Body | |
| | 1 | PATCH Cars(1) | Parts=Parts(1),Parts=Parts(3) | |

FIG. 2P

Operations Queue 232

| ID | Operation | Body |
|---|---|---|
| 1 | POST Orders | ID=1, Description=T-shirt, Customer={ID=1, GivenName=Jon} |
| 2 | POST Orders | ID=2, Description=Jeans, Customer=Customers(1) |
| 3 | DELETE Orders(1) | |

Operations Entries 234(1)-(3)

Operations Queue 232

| ID | Operation | Body |
|---|---|---|
| 1 | POST Orders | ID=1, Description=T-shirt, Customer={ID=1, GivenName=Jon} |
| 2 | POST Orders | ID=2, Description=Jeans, Customer=Customers(1) |
| 3 | DELETE Orders(1) | |

Operations Entries 234(1)-(3)

Operations Queue 236

Operations Entries 238(1)-(4):

| ID (239(1)) | Operation (239(2)) | Body (239(3)) |
|---|---|---|
| 1 | POST Customers | ID=1, GivenName=Jon |
| 2 | POST Orders | ID=1, Description=Jeans, Customer=Customers(1) |
| 3 | POST Orders | ID=2, Description=T-Shirt, Customer=Customers(1) |
| 4 | DELETE Customers(1) | |

FIG. 2S

Operations Queue 236

| ID (239(1)) | Operation (239(2)) | Body (239(3)) |
|---|---|---|
| *Empty* | *Empty* | *Empty* |

FIG. 2T

Operations Queue 240

Operations Entries 242(1)-(2):

| ID (243(1)) | Operation (243(2)) | Body (243(3)) |
|---|---|---|
| 1 | PATCH Orders(1) | Customer=Customers(2) |
| 2 | DELETE Customers(2) | |

FIG. 2U

Operations Queue 240

Operations Entries 242(1)-(2):

| ID (243(1)) | Operation (243(2)) | Body (243(3)) |
|---|---|---|
| 1 | PATCH Orders(1) | Customer=Customers(2) |
| 2 | DELETE Customers(2) | |

FIG. 2V

OPTIMIZING UPLOADS FOR AN OFFLINE SCENARIO BY MERGING MODIFICATION OPERATIONS

CROSS-REFERENCE TO RELATED APPLICATIONS

This application is related to co-pending U.S. patent application Ser. No. 16/212,990 by Borges et al., entitled "TRANSACTION MERGING FOR OFFLINE APPLICATIONS" filed on Dec. 8, 2018, which is incorporated by reference herein in its entirety.

BACKGROUND

Some applications may operate in an offline mode where modifications to an application resource are reflected locally, e.g., a mobile application dependent on remote data processing by a server may lose wireless connectivity and maintain a local copy of a remote storage object. Further, the modifications to the application resource may be pushed to the remote server when the mobile device regains connectivity, and used to update the application resource. For instance, during a synchronization process, the mobile application may push the modifications to the server which updates the remote instance of the storage object based on the modifications. Typically, when these operations are received downstream by a backend device from a plurality of client devices, the backend device may assign an individual logical unit of work to each operation. Individually processing the operations may result in poor system performance by creating disruptive bottlenecks when multiple devices return online within the same period of time, and pose scalability issues as the number of client devices and/or the number of operations increases.

BRIEF DESCRIPTION OF THE DRAWINGS

The accompanying drawings are incorporated herein and form a part of the specification.

FIGS. 2A-2V illustrate example operations queues, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for optimizing uploads for an offline scenario by merging modification operations.

As mentioned above, assigning an individual unit of work to every modification operation may lead to poor system performance and scalability issues. As used herein, in some instance, a "unit of work" may refer to an atomic sequence of one or more database operations which must be executed either in its entirely or not at all. Embodiments herein address these challenges by logically combining modification operations to produce the same end results at a backend system with a lighter workload. Further, in some embodiments, combining modification operations, rather than introducing new modification operations, ensures compatibility of the optimized modification operations with the backend system. As described in detail herein, a "modification operation" may refer to a create, update, or delete operation over a data collection (e.g., a database). Further, a modification operation may be a HTTP request method (e.g., a POST request, a PUT request, a DELETE request, or a PATCH request).

Figure 1:
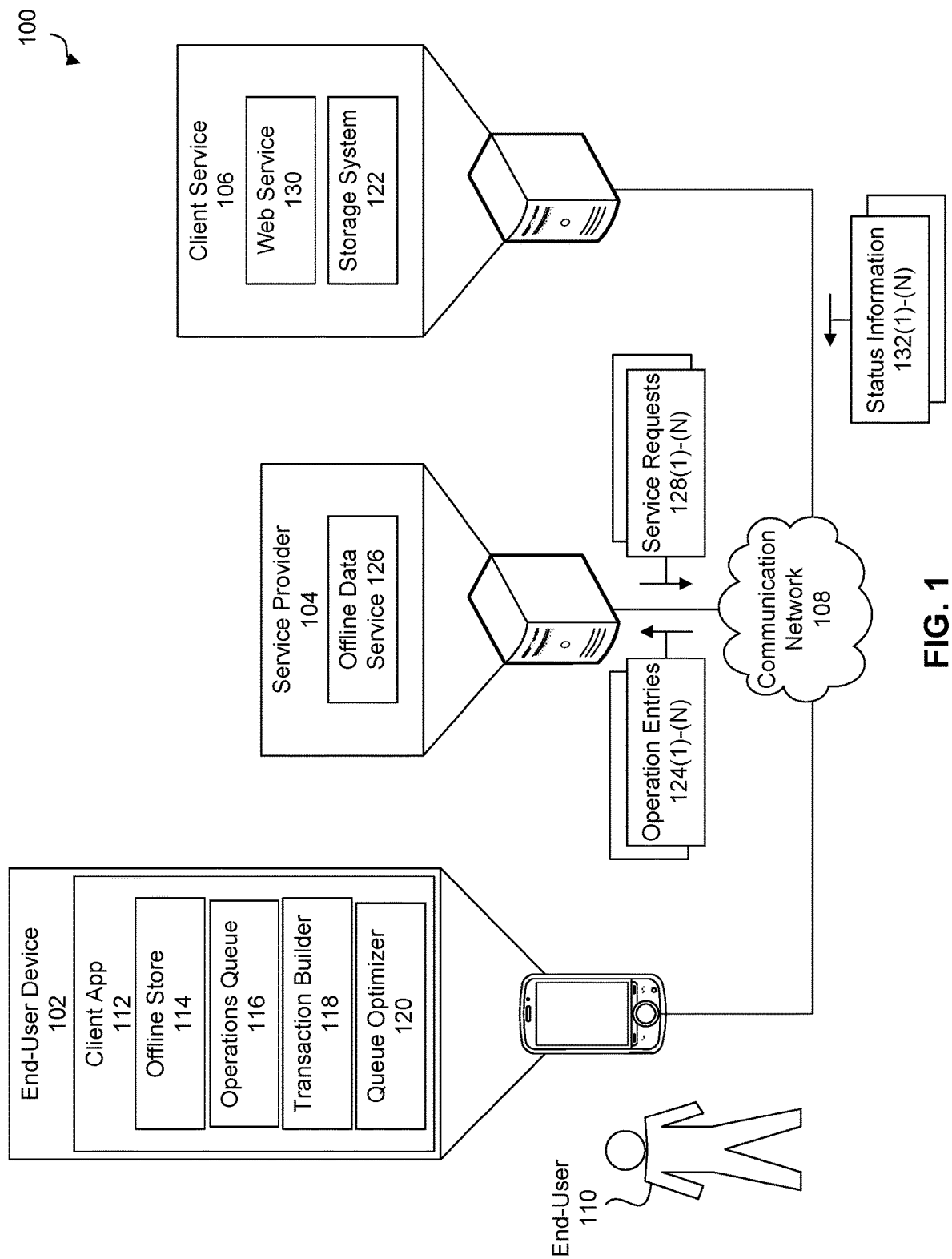
FIG. 1 is a block diagram of an example framework for optimizing uploads for an offline scenario by merging modification operations, according to some embodiments.

FIG. 1 illustrates a block diagram of an example framework for optimizing uploads for an offline scenario by merging modification operations in a distributed system 100, according to some embodiments. As illustrated in FIG. 1, the distributed system 100 includes an end-user device 102, a service provider 104, and a client service 106.

Additionally, the end-user device 102, the service provider 104, and client service 106 may communicate via a communication network(s) 108. The communication network 108 may include any combination of a private network, personal area network (PAN), Local-Area Network (LAN), Wide-Area Network (WAN), or the Internet. Further, the connection between the end-user device 102, the service provider 104, the client service 106, and the communication network 108 may be a wireless connection (e.g., Bluetooth or other short range wireless technology, cellular, Wi-Fi connection, etc.), or a wired connection (e.g., Ethernet, universal serial bus (USB), etc.), or a combination thereof.

As illustrated in FIG. 1, the end-user device 102 may be associated with an end-user 110. Some examples of an end-user device 102 include smart phones and mobile communication devices; tablet computing devices; wearable computing devices; desktops, laptops, netbooks and other portable computers, appliance, IoT (internet of things) device, and/or any other device capable of communicating with the service provider 104 or client service 106.

As shown in FIG. 1, the end-user device 102 may include a client application 112, application storage 114, an operations queue 116, a transaction builder 118, and a queue optimizer 120. As used herein, in some embodiments, a "client application" may refer to any application or software (e.g., client, agent, application, mobile application, desktop application, or module) operable to run on any device and interact with the service provider 104 or the client service 106.

Further, aspects of the client application 112 may be provided based on services and/or data provided by the client service 106 via the service provider 104. In particular, the service provider 104 may provide application services and core services to the client application 112 and the client service 106. For example, the service provider 104 may be a platform as a service (PaaS) or an application platform as a service (aPaaS). Additionally, use of the service provider 104 may allow the client service 106 to scale with business needs and delegate infrastructure and system operations to the service provider 104. Some examples of core services include application analytics, application resources, data integration, HTTP configuration, HTTPS configuration, life-cycle management, push notifications, security services, system health monitoring, etc. As described in detail herein, the client application 112 may perform modification operations in an offline mode over the application storage 114, maintain the operations queue 116 tracking the modification operations performed by the client application 112, and optimize the upload of the operations queue 116 to the service provider 104. Further, the service provider 104 may receive the optimized uploads from the client application 112, and facilitate synchronization of the application storage 114 based on the optimized uploads.

Further, the service provider 104 may be a multi-tenant system. As used herein, and in some embodiments, the term "multi-tenant system" refers to those systems in which various elements of hardware and software of the system may be shared by one or more customers (e.g., the operator of the client service 106) of the multi-tenant system operator.

Further, the client application 112 may be developed using a software development kit (SDK) associated with the service provider 104. As used herein, and in some embodiments, a "software development kit" may refer to a collection of tools that may be used to develop software application targeting a specific platform. For instance, the SDK may provide functions and libraries permitting the client application 112 to interact with the service provider 104. As an example, the SDK may provide logic for sending application programming interface (API) calls to an API of the service provider 104. As another example, the SDK may provide logic for synchronizing the application storage 114 with a backend system of the client service 106 via the service provider 104.

The application storage 114 may be initialized to permit the client application 112 to run in an offline mode. As used herein, and in some embodiments, an "offline mode" may refer to the ability of one or more aspects of the client application 112 to operate absent data connectivity. Offline usage of the client application 112 may enable the end-user 110 to continue use of the client application 112 when there is intermittent network coverage, supports business processes that may be executed by the end-user 110 while the client application 112 is offline, and/or improves performance by accessing offline data instead of sending requests (e.g., a request including one or more create, retrieve, update, delete operations) to the service provider 104. In some embodiments, the end-user or another software package on end-user device 102 may determine when the client application 112 switches between the online or offline modes. In some other embodiments, the client application 112 may be configured to periodically determine the data connectivity status between the end-user device 102 and the service provider 104 or the client service 106, and determine the mode based on the data connectivity status. For example, the client application 112 may transition from the online mode to the offline mode based on determining that the end-user device 102 has lost data connectivity to the service provider 104.

The application storage 114 stores data the client application 112 can access while executing in an offline mode. For instance, the application storage 114 may be initialized to include data from a storage system 122 (e.g., a database, a file system, a content management system, etc.) of the client service 106 that the client application 112 employs. In addition, the client application 112 may request data from the application storage 114 instead of the client service 106 when the client application 112 is in the offline mode. Further, modification operations may be performed within the application storage 114 while the client application 112 is in the offline mode. For example, the client application 112 may create or update a storage object within the application storage. As another example, the client application 112 may create or update a relationship between storage objects within the application storage 114. Additionally, when the client application 112 is online, the service provider 104 may determine the statuses of the application storage 114 and/or storage system 122, and synchronize the application storage 114 and the storage system 122 of the client service 106 when they are out of sync. In some embodiments, the client application 102, service provider 104, and/or client service 106 may send notifications indicating whether a synchronization process needs to be performed between the client application 112 and the client service 106.

As used herein, and in some embodiments, a "database" refers to an organized collection of data. A database may include a plurality of data tables comprising data values (e.g., alphanumeric strings, integers, decimals, floating points, dates, times, binary values, Boolean values, and/or enumerations). Some examples of databases include columnar databases, relational databases, key-store databases, graph databases, and document stores.

The operations queue 116 may store representations (i.e., the operation entries 124(1)-(N)) of modification operations performed over the application storage 114. In some embodiments, the operations queue 116 may be stored as one or more database tables of the application storage 114. In addition, the modification operations of the operations queue 116 may be organized by the transaction builder and/or queue optimizer 120, and sent to the service provider 104 as the operation entries 124(1)-(N).

The operation entries 124(1)-(N) may map a modification operation identifier, a modification operation, request body information, transaction information, and non-modifiability information to each other. For example, when the operations queue 116 is stored as one or more database tables, an individual row of the operations queue 116 may include a modification operation identifier identifying the sequential position of the modification operation, the modification operation performed over the application storage 114, body information including parameters to be processed with the modification operation, transaction information identifying a transaction including the modification operation, and/or a non-modifiability indicator. Further, the transaction information and/or the non-modifiability indicator may be used to identify modification operations that can be grouped into a logical unit of work executed at the client service 106, or optimized by the queue optimizer 120. In some embodiments, the transaction information may be stored in a custom header table of the database.

Additionally, the client application 112 may be configured to determine the transaction information for an operation entry of the operations queue 116. In some embodiments, the client application 112 may be configured to determine an entity (i.e., data object) of the application storage 114 associated with an operation over the application storage 114, and set the transaction information to an identifier corresponding to the entity/object. For instance, the client application 112 may determine that an operation pertains to a storage object of the application storage 114 based upon one or more attributes of the operation. As a result, the client application 112 may set the transaction information to a unique identifier of the storage object. In some other embodiments, a string identifier may be programmatically provided within the client application 112. For example, the client application 112 may be configured to set the transaction identifier of one or more operations to a string identifier provided within the code of the client application 112.

The transaction builder 118 may identify operation entries within the operations queue 116 that should be grouped into the same logical unit of work when executed by the client service 106. In some embodiments, the transaction builder 118 may determine the operation entries that should be grouped into the same logical unit of work based upon the transaction information of the operations queue 116.

For instance, the transaction builder 118 may identify a transaction identifier of the first database row entry of the operations queue 116, identify other database row entries in the operations queue 116 having the same transaction identifier, and generate an operation entry 124(1) including the modification operations associated with the first row entry and the other row entries identified as being associated with the transaction identifier. Further, the transaction builder 118 may determine other operation entries 124(2)-(N) by performing the same operation with respect to the remaining row entries of the operations queue 116. In some embodiments, the transaction identifier may identify a transaction including an associated operation.

Prior to sending the operation entries 124(1)-(N) to the service provider 104, the queue optimizer 120 may perform a queue optimization process that merges the operation entries 124(1)-(N) based on their corresponding modification operations. In some instances, the queue optimization process may include iteratively analyzing the operation entries 124(1)-(N) of the operations queue 116 in view of related information stored in one or more log files. In particular, the queue optimization process may identify modification operations associated with a common entity or relationship, and combine the identified modification operations in order to reduce the number of modification operations in the operations queue 116. Combining related modification operations into an optimized modification operation as opposed to introducing a new modification operation has the benefit of ensuring that the operation entries 124(1)-(N) of the post-optimization operations queue 116 are compatible with the client service 106, as the operation types of the post-optimization operations queue 116 were explicitly used by the client application 112 and thus known to be compatible with the client service 106. The queue optimizer 120 may minimize the amount of modification operations within the operations queue 116 while preserving pre-existing transaction boundaries and state-changing modification operations. Consequently, when the queue optimizer 120 performs the optimization process on the operations queue 116, the post-optimization set of modification operations will produce the same result at the client service 106.

In some embodiments, if the queue optimizer 120 identifies a create modification operation (e.g., a HTTP POST request method) followed by any number of update modification operations (e.g., HTTP PUT and/or HTTP PATCH request methods), which are then followed by a delete modification operation (e.g., a HTTP DELETE request method), the queue optimizer 120 may remove the identified modification operations within the operations queue 116. In some embodiments, if the queue optimizer 120 identifies a create modification operation (e.g., a HTTP POST request method) preceding one or more update modification operations, the operation optimizer 120 may combine the identified modification operations into the create modification operation. In some embodiments, if the queue optimizer 120 identifies a partial update modification operation (e.g., a HTTP PATCH request method) preceding one or more of other partial update modification operations, the queue optimizer 120 may combine the identified modification operations into the first partial update modification operation.

In some embodiments, if the queue optimizer 120 identifies a partial update modification operation followed by a full update modification operation (e.g., a HTTP PUT request method) preceding one or more update modification operations, the operation optimizer 120 may combine the identified modification operations into a full update modification operation. In some embodiments, if the queue optimizer 120 identifies a partial update modification operation followed by another partial update modification operation preceding one or more update modification operations, the operation optimizer 120 may combine the identified modification operations into a partial update modification operation. In some embodiments, if the queue optimizer 120 identifies an update modification operation followed by a delete modification operation (e.g., a HTTP DELETE request method), the queue optimizer 120 may combine (i.e., reduce) the identified modification operations into a delete modification operation. The queue optimizer may identify the modification operations for optimization based on at least one of a common association with an entity of the application storage 114

In some embodiments, the queue optimizer 120 may preserve transactions specified by the client application 112. As in detail herein, a transaction may be explicitly created by the client application 112. Further, the transaction builder 118 may manage transaction using transaction information defined in transaction information (e.g., a batchID, and a changesetID, etc.) within the operations queue 116. As used herein, a "changeset" refers to an atomic unit of work that is made up of an unordered group of one or more of insert, update, or delete modification operations in accordance with OData. In addition, as referred to herein, in some embodiments, a "batch" groups multiple operations into a single request payload (e.g., a HTTP request payload). Further, the identifiers of a changeset or batch may be programmatically set during the execution of a transaction.

In some embodiments, the queue optimizer 120 may determine whether two modification operations can be combined based on the transaction information. For example, the queue optimizer 120 may combine two modification operations that identify the same entity if and only if both modification operations belong to the same transaction (e.g., share the same batchID and changesetID values), and if and only if there are no other modification operations in between the two modification operations that identify the same entity and belong to a different transaction (e.g., have a different batchID and changesetID). In some examples, the queue optimizer 120 may combine modification operations that are within a transaction, and the queue optimizer 120 may also combine modification operations that are outside of the transaction when there are no intervening modification operations within the transaction that are associated with the same entity.

In some embodiments, the queue optimizer 120 may determine that two or more modification operations should not be combined based on at least one of the modification operations being marked as non-modifiable. The non-modifiable marking may ensure that a context of application storage 114 is reflected in the storage system 122. The client application 112 may be programmatically configured by the application developer to mark a modification operation as non-modifiable. In some instances, the client application 112 may configure the client application 112 to mark a modification operation as non-modifiable based on an operation type of the modification operation, an attribute of an entity related to the modification operation, and/or a relationship of an entity related to the modification operation. The non-modifiable marking may be stored within the operations queue 116. For example, the operations queue 116 may include a column indicating whether a modification operation is non-modifiable.

In addition, the queue optimizer 120 may determine whether to combine two or more modification operations based upon relationships between entities associated with the modification operations. For instance, the queue optimizer 120 may determine whether or not to combine two modification operations based on at least one of the modification operations having an effect on a relationship between two entities of the application storage 114.

In some embodiments, the queue optimizer 120 may determine that two or more modification operations should not be combined based on one of the modification operations referencing an entity that no longer exist at the time the optimized modification operation will be sent to the client service 106. The queue optimizer 120 may determine whether the operations queue 116 includes a create modification operation for an entity referenced in a modification operation. If the queue optimizer 120 does not find a create modification operation within the operations queue 116, the queue optimizer 120 may assume that the entity existed before the earliest modification in the operations queue 116. Consequently, the queue optimizer 120 may combine two or more modification operations within the operations queue 116 to reference the entity.

The queue optimizer may ensure that relationship cardinality is preserved during the optimization process. As used herein, in some embodiments, "relationship cardinality" may define how many entities are related at each end of a relationship. In some examples, the relationship cardinality may be one-to-one, one-to-many, many-to-many, etc.

In some embodiments, e.g., an OData implementation, a relationship between two entities can be marked as On Delete Cascade. When a relationship is marked as On Delete Cascade, deletion of the principal entity in the relationship causes deletion of all related dependent entities. For example, a customer-order relationship could be marked as On Delete Cascade so that if the customer is deleted all related orders are also deleted. Further, the queue optimizer 120 may determine whether to combine two or more modification operation based upon an entity of the modification operations having a relationship marked as On Delete Cascade.

In some embodiments, optimizing a modification operation (i.e., combining the modification operation with another modification operation) associated with a relationship may potentially effect a significant amount of entities, thus risking relationship integrity violations. Consequently, as described in detail with respect to FIGS. 2U-2V, the queue optimizer 120 may not optimize (i.e. combine with a different relationship operation) a modification operation when optimization would modify a relationship that causes at least one other relationship to be deleted.

The client application 112 may send the operation entries 124(1)-(N) to the service provider 104 for continued processing. In some other embodiments, the client application 112 may send the operation entries 124(1)-(N) directly to the client service 106. Further, the client application 112 and/or the client service 106 may employ the Open Data Protocol (OData). As such, the client application 112 may generate the operation entries 124(1)-(N) as OData changesets.

OData enables the creation of HTTP-based data services, which allow resources identified using Uniform Resource Identifiers (URIs) and defined in an abstract data model, to be published and edited by Web clients using simple HTTP messages. OData is intended to be used to expose and access information from a variety of sources including, but not limited to, relational databases, file systems, content management systems, and traditional Web sites.

At the core of OData are feeds, which are collections of typed entries. Each entry represents a structured record with a key that has a list of Properties of primitive or complex types. Entries can be part of a type hierarchy and may have related entries and related feeds through sinks. In addition to feeds and entries, OData services can expose service operations, which are simple, service-specific functions that accept input parameters and return entries or complex/primitive values.

The OData service interface has a number of operations that have uniform meaning across the resources it can act on. These operations include retrieve, create, update and delete and they respectively map to the GET, POST, PUT and DELETE HTTP methods. In some embodiments, an OData implementation may also include a PATCH method that applies partial update modifications. OData clients may query an OData service to retrieve a feed, entry, or service document by issuing an HTTP GET request against its URI. Further, OData clients may insert, update, and delete a feed, entry or service document by issuing a POST, PUT or DELETE request against its URI. In other words, OData services expose OData constructs (i.e., feeds, entries, properties within entries, links, service documents, and metadata documents) via URIs in one or more representation formats, which can be acted upon (query, update, insert, delete, and so on) by clients using basic HTTP requests.

In some embodiments, the service provider 104 may maintain a local copy of the operations queue 116 using the operation entries 124. For example, the client application 112 may send the first operation entry 124(1) and the second operation entry 124(2) to the service provider 104 for playback at the client service 106. Further, the client application 112 and the service provider 104 may employ a database replication technology to synchronize the application storage 114 and the storage system 122 of the client service 106. For example, the client application 112 and the service provider may use a data replication technology to transmit the operation entries 124(1)-(N) to synchronize the operations queue 116 and the local copy of the operations queue maintained by the service provider 104. In some instances, the client application 112 and the service provider 104 may employ the MobiLink protocol to synchronize the application storage 114, operations queue 116, and/or the storage system 122. Additionally, the database replication technology may utilize delta queries to synchronize only new and modified objects of the application storage 114, operations queue 116, and/or the storage system 122.

As illustrated in FIG. 1, the service provider 104 may include an offline data service 126 that enables the client application 112 to access data of the client service 106 without requiring data connectivity to the client service 106. In some embodiments, the offline data service 126 may be configured to initialize the application storage 114 of the client application 112, maintain delta information identifying changes made to the application storage 114 and the storage system 122, respectively, and/or update the application storage 114 and the storage system 122 based on the delta information. Further, the offline data service 126 may perform middle-tier caching of data from the storage system 122. For example, the offline data service 126 may cache common user data to reduce the amount of data that needs to be synchronized between the storage system 122 and the application storages of different users (e.g., the end-user 110).

Further, the offline data service 126 may receive the operation entries 124(1)-(N) from the client application 112 and generate service requests 128(1)-(N) corresponding to the operation entries 124(1)-(N) For example, the first service request 128(1) may correspond to the first operation entry 124(1), the Nth service request 128(N) may correspond to the Nth operation entry 124(N), and so forth. In addition, the service provider 104 may send the service requests 128(1)-(N) to the client service 106.

In some embodiments, the client service 106 may be an OData service (e.g., an OData producer), and the service requests 128(1)-(N) may be OData changesets. As such, the offline data service 126 may generate OData changesets based on the operation entries 124(1)-(N) and the OData specification, and send the OData changesets to the client service 106. In some other embodiments, the client service 106 may not be an OData service and the operation entries 124(1)-(N) may be OData operations. As such, the service provider 104 may generate the service requests 128(1)-(N) based on converting the OData operations of the operation entries 124(1)-(N) to a format associated with the client service 106. For example, the client service 106 may be a SQL system. As such, the service provider 104 may convert the OData operations of the operation entries 124 to SQL operations, and map the changesets to SQL transactions. As another example, the client service 106 may be a NoSQL system. As such, the service provider 104 may convert the OData operations of the operation entries 124 to NoSQL operations, and map the changesets to NOSQL transactions.

As illustrated in FIG. 1, the client service 106 may include a web service 130 and the storage system 122. In some embodiments, the web service 130 and/or storage system 122 may receive the service requests 128(1)-(N) from the service provider 104. Further, the web service 130 and/or storage system 122 may update the storage system 122 based upon the service requests 128(1)-(N). For example, the storage system 122 may receive the service requests 128(1)-(N), and update the contents of the storage system 122 in view of the modification operations included in the service requests 128(1)-(N). Further, the client service 106 may send status information 132(1)-(N) (e.g., acknowledgements or error messages) indicating the success or failure of the playback of the service requests 128(1)-(N). For example, the first status information 132(1) may correspond to the success or failure of the first service request 128(1), the Nth status information 132(N) may correspond to the success or failure of the Nth service request 128 (N), and so forth.

FIG. 2A illustrates an example operations queue (e.g., the operations queue 116), according to some embodiments. As illustrated in FIG. 2A, the operations queue 200 may include a plurality of operation entries 202(1)-(3) in a database table having an operation entry identifier column 203(1), an operation description column 203(2) describing the corresponding modification operation, and a body information column 203(3). In some embodiments, the operation description and the body information may be used to playback the operation at a remote storage system (e.g., the storage system 122). As illustrated in FIG. 2A, the operation entry 202(1) may correspond to a POST request method associated with an entity, the operation entry 202(2) may correspond to PATCH request method associated with the entity, and the operation entry 202(3) may correspond to a DELETE request method associated with the entity.

FIG. 2B illustrates an example representation of a result of optimization process performed by a queue optimizer (e.g., the queue optimizer 120) on the operations queue 200, according to some embodiments. As illustrated in FIG. 2B, the queue optimizer 120 may remove the operation entries 202(1)-(3) from the operations queue 200 based on identifying a POST request method (i.e., the operation entry 202(1)) followed by a PATCH request method (i.e., the operation entry 202(2)), which is then followed by a DELETE request method (i.e., the operation entry 202(3)). In this example, the queue optimizer 120 may remove operation entries 202(1)-(3) given that they all correspond to the same entity which is deleted.

The queue optimizer 120 may perform the following determinations. First, the queue optimizer 120 identifies a create modification operation (e.g., the POST request method) that creates the entity Customer(1) within the first operation entry 202(1). Next, the queue optimizer 120 determines whether the operations queue 200 includes any other operations related to the entity Customers(1). In the example shown in FIG. 2A, the operation entries 202(2)-(3) correspond to modification operations that modify the entity Customers(1). Next, the queue optimizer 120 analyzes the modifications operations of the operation entries 202(2)-(3) to determine whether a delete modification operation (e.g., a HTTP DELETE request method) occurs after either the create operation or an update operation (e.g., a HTTP PATCH request method or a HTTP PUT request method). When analyzing the operation entries 202(1)-(3), the queue optimizer 120 determines that the operation entries 202(1)-(3) operate on the same entity, and determine that the last the operation entry 202(3) nullifies the earlier operation entries 202(1)-(3). Consequently, the queue optimizer 120 removes all of the operation entries 202(1)-(3) from operations queue 200. Performance of the distributed system 100 is therefore optimized by avoiding the unnecessary transmission of operation entries 202(1)-(3) over communications network 108 and reducing the processing load of the service provider 104 and the client service 106. In this example, the processing load of the client device is reduced from three operation entries in FIG. 2A to zero operation entries in FIG. 2B.

FIG. 2C illustrates an example operations queue (e.g., the operations queue 116), according to some embodiments. As illustrated in FIG. 2C, the operations queue 204 may include a plurality of operation entries 206(1)-(3) in database table having an operation entry identifier column 207(1), an operation description column 207(2) for describing the corresponding modification operation, and body information column 207(3) including parameters to be processed with the modification operation by a client service (e.g., the client service 106). In some embodiments, the operation description and the body information may be used to playback the operation at a remote storage system (e.g., the storage system 122). As illustrated in FIG. 2C, the operation entry 206(1) may correspond to a POST request method associated with an entity Customers(1), the operation entry 206(2) may correspond to a PATCH request method associated with the entity Customers(1), and the operation entry 206(3) may correspond to a PATCH request method associated with the entity Customers(1).

FIG. 2D illustrates an example representation of a result of optimization process performed by a queue optimizer (e.g., the queue optimizer 120) on the operations queue 204, according to some embodiments. As illustrated in FIG. 2D, the queue optimizer 120 may combine the operation entries 206(1)-(3) from the operations queue 204 into a POST request method based on the queue optimizer 120 identifying a POST request method (i.e., the operation entry 206(1)) preceding any sequence of update modification operations (i.e., the operation entries 206(2)-(3)). Once the queue optimizer 120 has identified that the operation entries 206 (1)-(3) should be combined, the operation optimizer 120 may combine the identified modification operations (206(1)-(3)) into the POST request method (i.e., the operation entry 206(1)).

The queue optimizer 120 may perform the following determinations. First, the queue optimizer 120 determines that the operation entries 206(1)-(3) are related to a common entity. In the example shown in FIG. 2C, the operation entries 206(1)-(3) are all related to the entity Customers(1). Next, the queue optimizer 120 determines that operation entry 206(2) updates the data field set "Surname" by the first operation entry 206(1) that creates a customer entity, and operation entry 206(3) adds a new data field and corresponding data value to the customer entity created by the operation entry 206(1). In this example, the modification operations of the operation entries 206(2)-(3) are merged into the create operation (i.e., the POST request method) of the operation entry 206(1), as shown in FIG. 2D. Performance efficiencies are therefore gained through the queue optimizer 120 as described earlier.

FIG. 2E illustrates an example operations queue (e.g., the operations queue 116), according to some embodiments. As illustrated in FIG. 2E, the operations queue 208 may include a plurality of operation entries 210(1)-(8) in a database table having an operation entry identifier column 211(1), an operation description column 211(2) describing the corresponding modification operation, and body information column 211(3) including parameters to be processed with the modification operation by a client service (e.g., the client service 106). In some embodiments, the operation description and the body information may be used to playback the operation at a remote storage system (e.g., the storage system 122).

As illustrated in FIG. 2E, the distributed system 100 may optimize requests across a plurality of entities. Operation entry 210(1) may correspond to a POST request method associated with a first entity, the operation entry 210(2) may correspond to a POST request method associated with a second entity, the operation entry 210(3) may correspond to a PATCH request method associated with the first entity, the operation entry 210(4) may correspond to a PATCH request method associated with the first entity, the operation entry 210(5) may correspond to a PATCH request method associated with a third entity, the operation entry 210(6) may correspond to a PATCH request method associated with the second entity, the operation entry 210(7) may correspond to a PATCH request method associated with a fourth entity, and the operation entry 210(8) may correspond to a PATCH request method associated with the third entity.

FIG. 2F illustrates an example representation of a result of optimization process performed by a queue optimizer (e.g., the queue optimizer 120) on the operations queue 208 according to some embodiments. As illustrated in FIG. 2F, the queue optimizer 120 may combine the operation entries 210(1), 210(3), and 210(4) from the operations queue 208 into a POST request method based on the queue optimizer 120 identifying a POST request method (i.e., the operation entry 210(1)) preceding any sequence of update modification operations (i.e., the operation entries 210(3)-(4)) associated with a first entity. Further, the queue optimizer 120 may combine the operation entries 210(2) and 210(6) from the operations queue 208 into a POST request method based on the queue optimizer 120 identifying a POST request method (i.e., the operation entry 210(2)) preceding an update modification operations (i.e., the operation entry 210(2)) associated with a second entity. In addition, the queue optimizer 120 may combine the operation entries 210(5) and 210(8) from the operations queue 208 into a PATCH request method based on the queue optimizer 120 identifying a PATCH request method (i.e., the operation entry 210(1)) preceding one or more other PATCH request methods (i.e., the operation entry 210(8)).

FIGS. 2A-2F illustrate optimization of operations queues including modification operations outside of a transaction scope. In some other instances, an operations queue may include operation entries corresponding to modification operations performed within a transaction scope. As used herein, in some embodiments, a "transaction" may refer to a single atomic unit of logic or work including one or more database operations. FIGS. 2G-2H illustrate optimization over modification operations performed within a transaction scope.

FIG. 2G illustrates an example operations queue (e.g., the operations queue 116), according to some embodiments for which at least one of the corresponding modification operations were performed in a transaction scope. As illustrated in FIG. 2G, the operations queue 212 may include a plurality of operation entries 214(1)-(6) in a database table having an operation entry identifier column 215(1), an operation description column 215(2) describing the corresponding modification operation, body information column 215(3) including parameters to be processed with the modification operation by a client service (e.g., the client service 106), and transaction information columns (i.e., a batch identifier column 215(4) and a changeset identifier column 215(5)). In some embodiments, the operation description, the body information, the batch identifier, and the changeset identifier may be used to playback the operation at a remote storage system (e.g., the storage system 122). As illustrated in FIG. 2G, the operation entry 214(1) may correspond to a POST request method associated with a first entity, the operation entry 214(2) may correspond to a POST request method associated with a second entity, the operation entry 214(3) may correspond to a PATCH request method associated with the first entity and a first transaction, the operation entry 214(4) may correspond to a PATCH request method associated with the first entity and the first transaction, the operation entry 214(5) may correspond to a PATCH request method associated with the second entity, and the operation entry 214(6) may correspond to a PATCH request method associated with the first entity FIG. 2H illustrates an example representation of a result of optimization process performed by a queue optimizer (e.g., the queue optimizer 120) on the operations queue 212 according to some embodiments. As illustrated in FIG. 2H, the queue optimizer 120 may combine the operation entries 214(2) and 214(5) from the operations queue 212 into a POST request method based on the queue optimizer 120 identifying a POST request method (i.e., the operation entry 214(2)) associated with the second customer entity preceding one or more update modification operations (i.e., the operation entry 214(5)) associated with the second customer entity. Further, the queue optimizer 120 may combine the operation entries 214(3) and 214(4) from the operations queue 212 into a PATCH request method based on the queue optimizer 120 identifying a PATCH request method (i.e., the operation entry 214(3)) associated with the first customer entity within the transaction preceding an update modification operation (i.e., the operation entry 214(2)) associated with the first customer entity within the same transaction.

Although operation entries 214(1), 214(3)-(4), and 214(6) are associated with the same customer entity, the queue optimizer 120 may not combine the operation entries 214(1), 214(3)-(4), and 214(6) because they do not belong to the same transaction. Further, the queue optimizer 120 may not combine the operation entries 214(1) and 214(6) given the transaction boundary formed by operation entries 214(3)-(4) with respect to the first customer entity. However, the queue optimizer 120 may combine the operation entries 214(2) and 214(5) because the operation entries 214(2) and 214(5) do not modify the first customer entity modified within the transaction.

The queue optimizer 120 may perform the following determinations. First, the queue optimizer 120 identifies the transactions referenced within the operation queue 212 and their corresponding operations entries 214(1)-(6). For example, the queue optimizer 120 may determine that the operation entries 214(3) and 214(4) are associated with the first transaction. Next, the queue optimizer 120 determines if any of the operation entries 214(1)-(6) may be optimized in accordance with the optimization processes described herein. For example, the queue optimizer 120 may determine that the operation entries 214(3) and 214(4) are optimizable because they are associated with the same entity and represent a PATCH request method preceding another PATCH request method. Further, if any of the operation entries 214(1)-(6) are optimizable with each other, the queue optimizer 120 may optimize the operation entries 214(1)-(6) if optimization of the operations entries 214(1)-(6) does not cross a transactional boundary. For example, the queue optimizer 120 combines the operation entries 214(3)-(4) because optimizing the operation entries 214(3)-(4) does not cross a transactional boundary given that they are within the same transaction.

FIG. 2I illustrates an example operations queue (e.g., the operations queue 116) including at least one operation entry identified as non-modifiable, according to some embodiments. As illustrated in FIG. 2I, the operations queue 216 may include a plurality of operation entries 218(1)-(6) in a database table having an operation entry identifier column 219(1), an operation description column 219(2) describing the corresponding modification operation, body information column 219(3) including parameters to be processed with the modification operation by a client service (e.g., the client service 106), and a modifiability information column 219(4) indicating whether the modification operation associated with the operation entry has been marked by the client application 112 as non-modifiable. In some embodiments, the operation description and the body information may be used to playback the operation at a remote storage system (e.g., the storage system 122).

As illustrated in FIG. 2I, the operation entry 218(1) may correspond to a non-modifiable POST request method associated with a first entity, the operation entry 218(2) may correspond to a modifiable PATCH request method associated with the first entity, the operation entry 218(3) may correspond to a modifiable PATCH request method associated with the first entity, the operation entry 218(4) may correspond to a modifiable PATCH request method associated with the first entity, the operation entry 218(5) may correspond to a non-modifiable PATCH request method associated with the first entity, and the operation entry 218(6) may correspond to a modifiable PATCH request method associated with the first entity.

As shown in FIG. 2I, two operation entries (218(1) and 218(3)) may be marked as non-modifiable via a data value (i.e., True) in the modifiability information column 219(4). As described in detail above, a non-modifiable marker indicates to the queue optimizer 120 that an operation entry that may otherwise be combined with other operation entries should not be combined with the other operation entries. In some embodiments, an operation entry may be marked as non-modifiable to preserve operation history in support of an audit, if needed.

FIG. 2J illustrates an example representation of a result of optimization process performed by a queue optimizer (e.g., the queue optimizer 120) on the operations queue 216 according to some embodiments where one or more operation entries are marked as non-modifiable. In some instances, the modifiability information may be programmatically provided by the client application 112. For example, the client application 112 may be configured to set an operation entry as non-modifiable based on a type of the modification operation corresponding to the operation entry, a type of the entity associated with the operation entry, a type of the function/method that calls the modification operation, an attribute of the function/method that calls the modification operation, etc. As illustrated in FIG. 2J, the queue optimizer 120 may not combine the operation entry 218(1) with any of the other operation entries 218(2)-(6) based on the queue optimizer 120 identifying that the operation entry 218(1) is marked non-modifiable within the operations queue 216. Similarly, the queue optimizer 120 may not combine the operation entry 218(4) with any of the other operation entries 218(1)-(3) and (5)-(6) based on the queue optimizer 120 identifying that the operation entry 218(4) is marked non-modifiable within the operations queue 216. Further, the queue optimizer 120 may combine the operation entries 218(2) and 218(3) from the operations queue 216 into a PATCH request method based on the queue optimizer 120 identifying a PATCH request method (i.e., the operation entry 218(2)) preceding one or more other PATCH request methods (i.e., the operation entry 218(3)). However, the queue optimizer 120 may not combine the operation entries 218(2)-(3) with the operation entries 218(5)-(6) based on the queue optimizer 120 identifying that there is an intervening non modifiable operation entry between operation entries 218(2)-(3) and operation entries 218(5)-(6) that is associated with the same entity.

FIG. 2K illustrates an example operations queue (e.g., the operations queue 116), according to some embodiments. FIG. 2T differs from FIG. 2R in that FIG. 2K does not include non-modifiability information. As illustrated in FIG. 2K, the operations queue 220 may include a plurality of operation entries 222(1)-(3) in a database table having an operation entry identifier column 223(1), an operation description column 223(2) describing the corresponding modification operation, and body information column 223 (3) corresponding to the modification operation to be processed by a client service. In some embodiments, the operation description, and the body information may be used to playback the operation at a remote storage system (e.g., the storage system 122). As illustrated in FIG. 2K, the operation entry 222(1) may correspond to a POST request method defining a relationship between a first order entity and a first product entity, the operation entry 222(2) may correspond to a PATCH request method associated with the first order entity, and the operation entry 222(3) may correspond to a PATCH request method modifying the relationship to reference a second product entity instead of the first product entity. In this example, the entity, "Order(1)" has relationships, at certain times, with entities, "Product(1)," and "Product(2)." As operations queue 220 does not have a create operation (e.g., a POST request method) for creating either Product(1) or Product(2) in FIG. 2K, the queue optimizer 120 determines that these entities were previously-defined.

FIG. 2L illustrates an example representation of a result of optimization process performed by a queue optimizer (e.g., the queue optimizer 120) on the operations queue 216 according to some embodiments. As illustrated in FIG. 2L, the queue optimizer 120 may combine the operation entries 222(1)-(3) into the operation entry 222(1) based on the queue optimizer 120 determining that the operation entries 222(1)-(3) do not create the second product entity.

The queue optimizer 120 may perform the following determinations. The queue optimizer 120 may analyze the body information column 223(2) of the modification operations associated with the operations queue 220, and determine that the product entities (i.e., Product(1) and Product (2)) are referenced within the operations queue 216. Next, the queue optimizer 120 may determine that the modification operation of the operation entry 222(2) updates the reference to Product(1) in the operation entry 222(1) to Product(2). Having made this determination, the queue optimizer 120 then analyzes the preceding operation entries 222(1)-(2) to determine if the Product(2) was created in one of the preceding operation entries 222(1)-(2). Once it is determined that Product(2) was not created in an intervening modification operation based upon analyzing operation entry 222(2), the queue optimizer 120 modifies the operation entry 222(1) to reference Product(2) instead of Product(1) and deletes the operation entry 222(3). Further, the queue optimizer 120 may update the "Quantity" data field from five to ten within the modification operation, and delete the operation entry 222(2).

FIG. 2M illustrates an example operations queue (e.g., the operations queue 116), according to some embodiments where an entity is created in the operations queue 224 before its relationship with another entity is created. As illustrated in FIG. 2M, the operations queue 224 may include a plurality of operation entries 226(1)-(4) in a database table having an operation entry identifier column 227(1), an operation description column 227(2) describing the corresponding modification operation, and body information column 227(3) corresponding to the modification operation to be processed by a client service. In some embodiments, the operation description, and the body information may be used to playback the operation at a remote storage system (e.g., the storage system 122). As illustrated in FIG. 2M, the operation entry 226(1) may correspond to a PATCH request method defining a relationship between a first car entity and a first parts entity, the operation entry 226(2) may correspond to a PATCH request method a relationship between the first car entity and a second parts entity, the operation entry 226(3) may correspond to a POST request method creating a third parts entity, and the operation entry 226(4) may correspond to a PATCH request method defining a relationship between the first car entity and the third parts entity. As illustrated in FIG. 2M, in some embodiments, a PATCH request method may update user-defined types and objects.

FIG. 2N illustrates an example representation of a result of optimization process performed by a queue optimizer (e.g., the queue optimizer 120) on the operations queue 216 according to some embodiments. As illustrated in FIG. 2N, the queue optimizer 120 may combine the operation entries 226(1)-(2) into the operation entry 226(1) based on the queue optimizer 120 identifying a PATCH request method (i.e., the operation entry 226(1)) preceding the PATCH request method (i.e., the operation entry 226(2)) associated with the same entity. Further, the queue optimizer 120 may not combine the operation entries 226(4) into the operation entry 222(1) based at least in part on the third parts entity not existing when the modification operation pertaining to operations entry 226(1) is performed.

FIG. 2O illustrates an example operations queue (e.g., the operations queue 116), according to some embodiments. As illustrated in FIG. 2O, the operations queue 228 may include a plurality of operation entries 230(1)-(4) in a database table having an operation entry identifier column 231(1), an operation description column 231(2) describing the corresponding modification operation, and body information column 231(3) corresponding to the modification operation to be processed by a client service. In some embodiments, the operation description, and the body information may be used to playback the operation at a remote storage system (e.g., the storage system 122). In some embodiments, the modification operations of the operation entries 230(1)-(4) may be associated with a one-to-many relationship cardinality between entities of the client application 112. For example, a car is a single entity onto itself, and may have a one-to-many cardinality relationship with entities representing the parts comprising the car. As illustrated in FIG. 2O, the operation entry 230(1) may correspond to a patch modification operation defining a relationship between a first car entity and a first parts entity, the operation entry 230(2) may correspond to a PATCH request method defining a relationship between the first car entity and a second parts entity, the operation entry 230(3) may correspond to a DELETE request method deleting the relationship between the first car entity and the second parts entity, and the operation entry 230(4) may correspond to a PATCH request method defining a relationship between the first car entity and the third parts entity. Further, the client application 112 may implement a schema that permits part entities to exist apart from car entities. In FIG. 2O, the operation entries 230(2)-(3) establish and delete a relationship between two pre-existing entities (i.e., the entity Cars(1) and the entity Parts(2)).

FIG. 2P illustrates an example representation of a result of optimization process performed by a queue optimizer (e.g., the queue optimizer 120) on the operations queue 228 according to some embodiments. As illustrated in FIG. 2P, the queue optimizer 120 may combine the operation entries 230(1) and 230(4) into the operation entry 230(1) based on the queue optimizer 120 identifying a PATCH request method (i.e., the operation entry 230(1)) preceding the PATCH request method (i.e., the operation entry 230(4)) associated with the same entity, and identifying that operation entry 230(3) nullifies operation entry 230(2). Given that part entities are permitted to exist outside of a relationship with a car entity, the queue optimizer 120 may be permitted to delete the relationship between the car entity (i.e., Cars (1)) and the second parts entity (i.e., Parts(2)) without having to delete the second parts entity or place the second parts entity into a state inconsistent with the schema of the client application 112.

FIG. 2Q illustrates an example operations queue (e.g., the operations queue 116), according to some embodiments. As illustrated in FIG. 2Q, the operations queue 232 may include a plurality of operation entries 234(1)-(3) in a database table having an operation entry identifier column 235(1), an operation description column 235(2) describing the corresponding modification operation, and body information column 235(3) corresponding to the modification operation to be processed by a client service. In some embodiments, the operation description, and the body information may be used to playback the operation at a remote storage system (e.g., the storage system 122). As illustrated in FIG. 2Q, the operation entry 234(1) may correspond to a POST request method that creates a first order entity, creates a first customer entity, and defines a relationship between the first order entity and the first customer entity. The operation entry 234(2) may correspond to a POST request method that creates a second order entity, and defines a relationship between the second order entity and the first customer entity. The operation entry 234(3) may correspond to a DELETE request method deleting the first order entity. Further, in some embodiments, the modification operations of the operation entries 234(1)-(3) may be associated with a relationship cardinality that does not permit a customer entity to exist without a corresponding order entity. FIG. 2Q differs from prior FIG. 2O in at least two ways. First, the cardinality of the entities is different. In FIG. 2O, the cardinality was zero or one-to-zero or more (e.g., a car may have one or more parts, and a part can also exist apart from a car). In the operations queue 232 shown in FIG. 2Q, the relationship cardinality between customer entities and order entities is one-to-many. That is, every order has one customer. Without a customer, there cannot be a meaningful order. Second, the create modification operation (i.e., the POST request method) of the operation entry 234(1) generates two new entities: Orders(1) and Customer(1), whereas FIG. 2O did not create new entities.

FIG. 2R illustrates an example representation of a result of optimization process performed by a queue optimizer (e.g., the queue optimizer 120) on the operations queue 232 according to some embodiments. As illustrated in FIG. 2R, the queue optimizer 120 may not combine the operation entries 234(1)-(3) based on the queue optimizer 120 identifying that consolidating the operation entries 234(1)-(3) would lead to violating the relationship cardinality. Further, in some embodiments, the queue optimizer 120 cannot alter the operation entry 234(1) to merely create the customer entity and combine the create modification operation with the operation entry 234(2), as the queue optimizer 120 may be configured to use the same modification operations during the combination process to ensure compatibility. In some other embodiments, the queue optimizer may alter the operation entry 234(1) to create the customer entity and combine the create modification operation with the operation entry 234(2) based on a protocol of the client service 106.

The queue optimizer 120 may perform the following determinations. First, the queue optimizer 120 analyzes the operations queue 232, and determines that operation entries 234(1) and 234(3) are potentially optimizable as they relate to the same entity (i.e., Orders(1)). However, in the next step, queue optimizer 120 reviews the body information of operation entry 234(1), and determines that entity Customer(1) is created via the POST request method. Next, the queue optimizer 120 analyzes the remaining operation entries 234(2)-(3), and determines that the creation of the Customer(1) entity in operation entry 234(1) cannot be removed in view of the required cardinality relationship between an order entity and a customer entity. In other words, because each order entity must reference a customer entity, the queue optimizer 120 determines that the deletion of the operation entry 234(1) is not permitted given that the Customer(1) entity created in operation entry 234(1) is referenced in operation entry 234(2). The queue optimizer 120 then determines that it cannot modify or reduce the operation entries 234(1)-(3) by deleting operation entries 234(1) and 234(2) because doing so corrupts operation entry 234(2) as there would be no pre-existing Customer(1) associated with Order(2). The cardinality of having one customer associated with one order would be broken.

FIG. 2S illustrates an example operations queue (e.g., operations queue 116), according to some embodiments. As illustrated in FIG. 2S, the operations queue 236 may include a plurality of operation entries 238(1)-(4) in a database table having an operation entry identifier column 239(1), an operation description column 239(2) describing the corresponding modification operation, and body information column 239(3) corresponding to an operation entry to be processed by a client service (e.g., the client service 106). In some embodiments, the operation description and the body information may be used to playback the operation at a remote storage system (e.g., the storage system 122). As illustrated in FIG. 2S, the operation entry 238(1) may correspond to a POST request method associated with a customer entity, the operation entry 238(2) may correspond to a POST request method associated with a first order entity referencing the customer entity, the operation entry 238(3) may correspond to a POST request method associated with a second order entity referencing the first customer entity, the operation entry 238(4) may correspond to a DELETE request method deleting the customer entity. Further, as described herein, the relationships defined within the operation entries 238(2)-(3) may be marked as On Delete Cascade. One feature of note in FIG. 2S is that all of the entities in the operations queue 236 are created in FIG. 2S. In other words, prior to execution of the modification operations of the operations queue 236, the Customers(1), Orders(1) and Orders(2) entities did not exist within the distributed system 100.

FIG. 2T illustrates an example representation of a result of optimization process performed by a queue optimizer (e.g., the queue optimizer 120) on the operations queue 236, according to some embodiments. FIG. 2T differs from FIG. 2R in that optimization is possible because the cardinality relationship can be maintained. As illustrated in FIG. 2T, the queue optimizer 120 may remove the operation entries 238(1)-(3) from the operations queue 236 based on the relationships defined by the modification operations of the operation entries 238(1)-(3) being marked as On Delete Cascade. When the customer entity is deleted by the modification operation of operation entry 238(4), the other operation entries 238(1)-(3) are deleted based on their respective relationship to the customer entity and/or the On Delete Cascade attribute. For example, the operation entry 238(2) is deleted based on tits corresponding modification operation including a relationship referencing the deleted customer entity.

The queue optimizer 120 may perform the following determinations. First, the queue optimizer 120 identifies the entities associated with the operations queue 236. In FIG. 2S, the queue optimizer 120 identifies the entities Customer(1), Order(1), and Order(2) within the operations queue 236. Next, the queue optimizer 120 identifies the relationships and relationship cardinalities between the identified entities. In particular, the queue optimizer 120 identifies a relationship between the entity Order(1) and the Customer(1), a relationship between the entity Order(2) and the entity Customer(1), and a one-to-many cardinality relationship between customer entities and order entities. Next, the queue optimizer 120 determines that operation entry 238(4) corresponds to the deletion of the Customer(1). Then, the queue optimizer 120 determines that Customer(1) was created in one of the operation entries 238(1)-(4) contained in the operations queue 236. This means that all relationships to Customers(1), and by extension Orders(1) and Orders(2), are included in the operations queue 236 such that no other relationships to these entities exist in the distributed system 100. As noted earlier, an order entity requires relationship to a customer entity such that the deletion of a customer causes a corresponding or cascading deletion of all related order entities. Thus, queue optimizer 120 determines that the operation entities 238(1)-(4) should be deleted resulting in the empty operations queue 236 in FIG. 2T.

FIG. 2U illustrates an example operations queue (e.g., the operations queue 116), according to some embodiments. As illustrated in FIG. 2U, the operations queue 240 may include a plurality of operation entries 242(1)-(2). Further, each operation entry 242 may include an operation entry identifier, an operation description describing the corresponding modification operation, and body information corresponding to the modification operation to be processed by a client service. In some embodiments, the operation description, and the body information may be used to playback the operation at a remote storage system (e.g., the storage system 122). As illustrated in FIG. 2U, the operation entry 242(1) may correspond to a PATCH request method that modifies an order entity. In particular, the PATCH request method modifies a relationship of the order entity from referencing a first customer entity to referencing a second customer entity. Further, the operation entry 242(2) may correspond to a DELETE request method deleting the second customer entity.

FIG. 2U may represent a scenario wherein a) the wrong customer entity is referenced by the entity Orders(1) prior to populating the operations queue 240, b) the operation entry 242(1) represents an operation performed by the client application 112 to correct the entity Order(1) to reference the entity Customers(2), but c) after that, the client application performs a delete modification operation associated with the operation entry 242(2) to deleted the entity Customer(2). The operations queue 240 in FIG. 2U differs from the operations queue 236 in FIG. 2S in at least that not all of the entities are created in modification operations associated with the operation entries 242(1)-(3). As such, there could be relationships that existed between other entities and Orders (1) or Customers(2) that are not included in the operations queue 240 of FIG. 2U. E.g., the pre-existing relationship between Orders(1) and the incorrect customer entity.

FIG. 2V illustrates an example representation of a result of optimization process performed by a queue optimizer (e.g., the queue optimizer 120) on the operations queue 240 according to some embodiments. As illustrated in FIG. 2V, the queue optimizer 120 may not combine or delete the operation entries 242(1)-(2) from the operations queue 240 based on the DELETE request method affecting a plurality of entities. For example, if the queue optimizer 120 removes the PATCH request method based on the DELETE request method, the storage system may lose consistency with the client service 106 by failing to reflect that the order entity should not reference any other customer entity.

The queue optimizer 120 may perform the following determinations. The queue optimizer 120 begins by identifying the entities associated with the operations queue 240. In FIG. 2V, the queue optimizer 120 identifies the entities Customer(2) and Order(1) within the operations queue 240. Next, the queue optimizer 120 identifies the relationships associated with the identified entities. In particular, the queue optimizer 120 identifies a relationship between the entity Order(1) and the entity Customer(2), and a one-to-many cardinality relationship between customer entities and order entities. As such, the queue optimizer 120 determines that it cannot modify or reduce the operation entries 242 (1)-(2) within the operations queue 240 because doing so may generate corrupt data. In this case, the entity Orders(1) was associated with the wrong customer entity prior to current state of the operations queue 240. If the queue optimizer 120 were to delete the entity Customer(2), and by extension the entity Orders(1), as was shown in FIG. 2T, the erroneous relationship between the entity Orders(1) and the other customer entity would remain.

Figure 3:
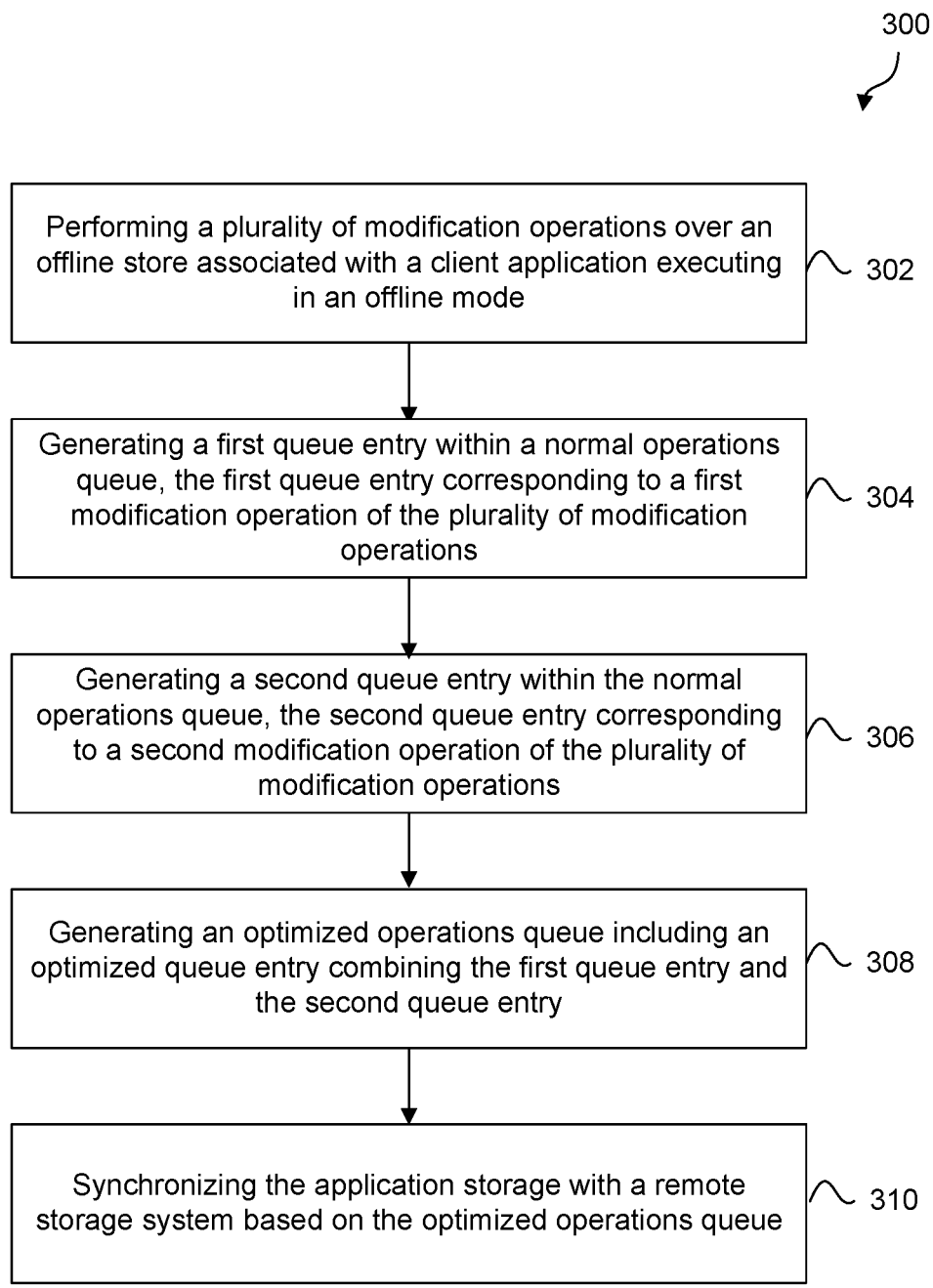
FIG. 3 is a flowchart illustrating a process for improving and even optimizing uploads for an offline scenario by merging modification operations, according to some embodiments.

FIG. 3 is a flowchart of a method 300 for implementing request merging for offline applications, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

In 302, the end-user device may perform a plurality of modification operations over application storage associated with a client application executing in an offline mode. For instance, the client application 112 may perform a first operation that creates or modifies an entity of the application storage 114, and a second operation that modifies the entity of. Further, in some instances, the client application 112 may perform at least one of the first operation and the second operation in a transaction. In some embodiments, the operations include modification operations, e.g., a create operation, a partial update operation, an update operation, an update operation, or a delete operation, performed over a database. As an example, a first POST request method may create a first customer entity corresponding to a new customer on the application storage 114, and a second PATCH request method may update the surname the of customer entity.

In 304, the end-user device may generate a first queue entry within a normal operations queue, the first queue entry corresponding to a first modification operation of the plurality of modification operations. For example, the client service 112 may add an operation entry 206(1) to the operations queue 204 that includes an operation description of the first purchase order, body information corresponding to the first purchase order, and transaction information identifying a transaction associated with the first purchase order.

In 306, the end-user device may generating a second queue entry within the normal operations queue, the second queue entry corresponding to a second modification operation of the plurality of modification operations. For example, the client service 112 may add a second entry 206(2) to the operations queue 204 that includes an operation description of the update to the first purchase order, body information corresponding to the update to the first purchase order, and transaction information identifying a transaction associated with the update to the first purchase order.

In 308, the end-user device may generate an optimized operations queue including an optimized queue entry combining the first queue entry and the second queue entry. For example, the queue optimizer 120 may logically combine the second queue entry 206(2) into the first operation entries 206(1) within the operations queue 204 during an optimization process. As illustrated in FIG. 2D, the queue optimizer 120 may logically combine the operation entries 206(1)-(2) from the operations queue 204 into a POST request method based on the queue optimizer 120 identifying a POST request method (i.e., the operation entry 206(1)) preceding an update modification operation (i.e., the operation entry 206(2)). Once the queue optimizer has identified that the operation entries 206(1)-(2) should be combined, the operation optimizer 120 may combine the identified modification operations (206(1)-(3)) into the POST request method (i.e., the operation entry 206(1)). In some embodiments, the optimized operations queue may be the result of an in place update to the normal operations queue, or a newly-generated operations queue.

As described in detail herein, the queue optimizer 120 may logically combine operation entries during the optimization process as follows: The request queue optimizer merges entity operations as follows: a POST request method for an entity followed by any number of updates (PUT and/or PATCH request methods) to the entity followed by a DELETE request method for the entity may result in all modification operations being removed from the operations queue; a POST request method for an entity followed by any sequence of update modification operations (PUT and/or PATCH request methods) for the entity may result in the modification operations being logically combined into the POST request method; a PATCH request method for an entity followed by any sequence of PATCH request methods for the entity may result in the modification operations being logically combined into the first PATCH request method; a PATCH or PUT request method for an entity followed by a PUT request method for the entity and then subsequently followed by any sequence of PUT or PATCH request methods for the entity may result the modification operations being logically combined into the PUT request method; a PATCH or PUT request method for an entity followed by a DELETE request method for the entity may be logically combined into a DELETE request method.

In 310, the end-user device may synchronize the application storage with a remote storage system based on the optimized operations queue. For example, the client application 112 may send the operation entry 124(1) to the service provider 104. Further, upon receipt of the operation entry 124(1), the offline data service 126 may generate the service request 128(1), and send the service request 128(1) to the client service 106. In addition, the client service 106 may playback the contents of the service request 128(1) in order to update the storage system 122 to reflect the performance of the first operation and the second operation.

In some embodiments, the service provider 104 may be an OData producer. As such, the service request 128(1) may be generated in accordance with the OData protocol. For example, the service request 128(1) may include an OData changeset representing the first operation and the second operation according to the OData protocol.

Figure 4:
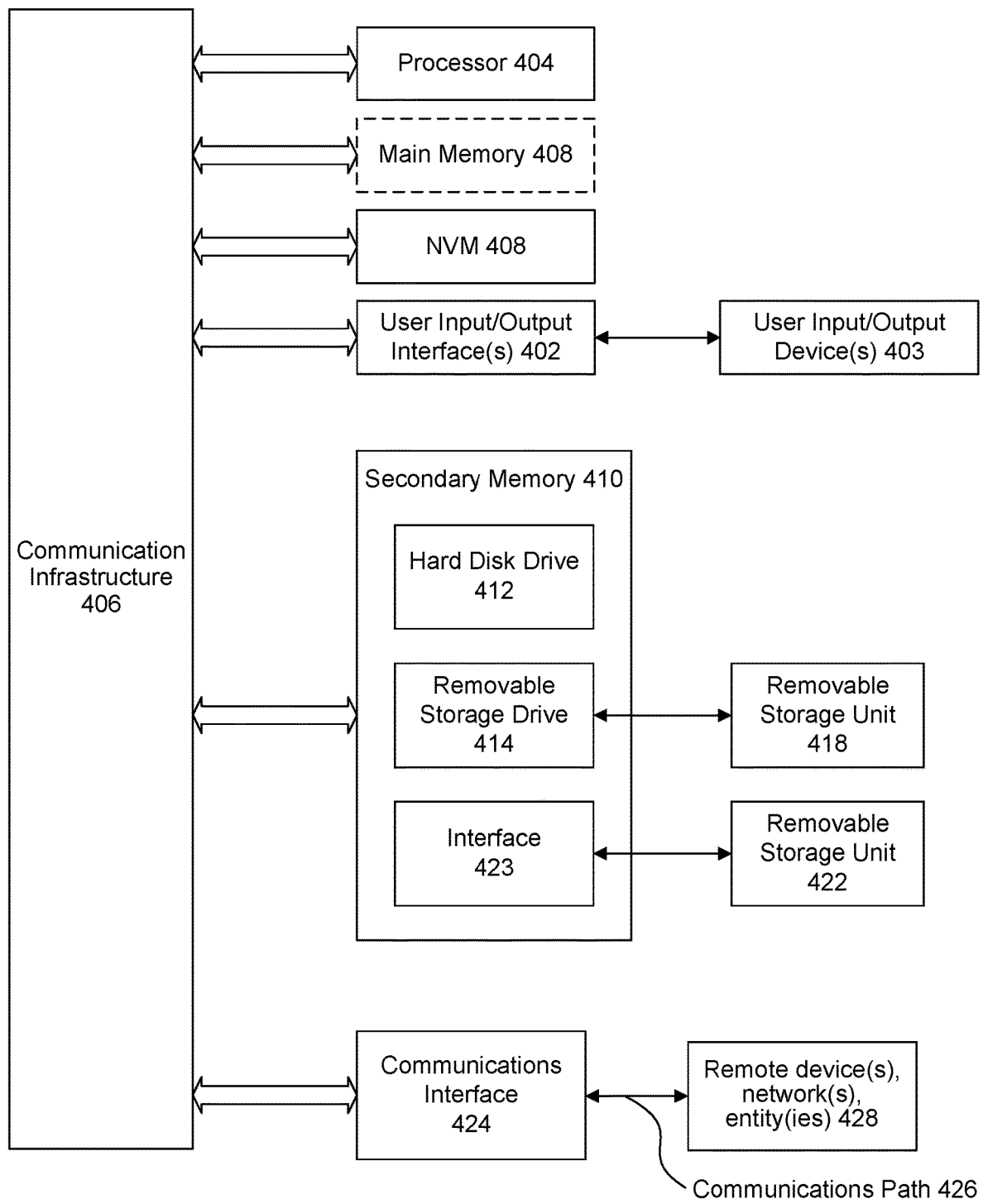
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
performing, by an end-user device and without synchronizing application storage associated with a client application executing in an offline mode with a remote storage system, operations comprising:
  performing by the end-user device, a plurality of modification operations over the application storage;
  generating, by the end-user device, a first queue entry within a normal operations queue, the first queue entry corresponding to a first modification operation of the plurality of modification operations;
  generating, by the end-user device, a second queue entry within the normal operations queue, the second queue entry corresponding to a second modification operation of the plurality of modification operations;
  determining, by the end-user device, that the first queue entry and the second queue entry are associated with an entity of the application storage; and
  in response to determining that the first queue entry and the second queue entry are associated with the entity, generating, by the end-user device, an optimized operations queue including an optimized queue entry combining the first queue entry and the second queue entry; and
after the performing the operations, synchronizing the application storage with the remote storage system based on the optimized operations queue.

2. The method of claim 1, wherein generating the optimized operations queue comprises:
generating the optimized queue entry using a type of the first modification operation.

3. The method of claim 1, wherein generating the optimized operations queue comprises:
determining that the first modification operation is a create modification operation; and
determining that the second modification operation performs an update operation with respect to the entity.

4. The method of claim 1, wherein generating the optimized operations queue comprises:

determining that the first modification operation is a first update modification operation with respect to the entity; and determining that the second modification operation performs a second update modification operation with respect to the entity.

5. The method of claim 1, wherein generating the optimized operations queue comprises:

determining that the first modification operation and the second modification operation were performed within a transaction based on transaction information within the first queue entry and the second queue entry.

6. The method of claim 1, further comprising:

generating a third queue entry within the normal operations queue, the third queue entry corresponding to a third modification operation of the plurality of modification operations; and wherein generating the optimized operations queue including the optimized queue entry comprises:

determining that the first queue entry, the second queue entry, and the third queue entry are associated with the entity; and generating the optimized queue entry without relying on the third queue entry based on an intervening transaction boundary.

7. The method of claim 1, further comprising:

generating a third queue entry with a non-modifiable marker within the normal operations queue, the third queue entry corresponding to a third modification operation of the plurality of modification operations; and wherein generating the optimized operations queue including the optimized queue entry comprises:

determining that the first queue entry, the second queue entry, and the third queue entry are associated with the entity; and generating the optimized queue entry without relying on the third queue entry based on the non-modifiable marker.

8. The method of claim 1, further comprising:

generating a third queue entry within the normal operations queue, the third queue entry corresponding to a third modification operation of the plurality of modification operations; and wherein generating the optimized operations queue including the optimized queue entry comprises:

determining that the second queue entry and the third queue entry are associated with the entity; and determining that the third queue entry is a delete modification operation associated with the entity;

identifying an On Delete Cascade attribute associated with a relationship of the second queue entry; and generating the optimized queue entry without the second queue entry and the third queue entry based on the On Delete Cascade attribute.

9. A non-transitory computer-readable device having instructions stored thereon that, when executed by at least one computing device, cause the at least one computing device to perform operations comprising:

performing, by an end-user device and without synchronizing application storage associated with a client application executing in an offline mode with a remote storage system, operations comprising:

performing by the end-user device, a plurality of modification operations over application storage;

generating, by the end-user device, a first queue entry within a normal operations queue, the first queue entry corresponding to a first modification operation of the plurality of modification operations;

generating, by the end-user device, a second queue entry within the normal operations queue, the second queue entry corresponding to a second modification operation of the plurality of modification operations;

determining, by the end-user device, that the first queue entry and the second queue entry are associated with an entity of the application storage; and in response to determining that the first queue entry and the second queue entry are associated with the entity, generating, by the end-user device, an optimized operations queue including an optimized queue entry combining the first queue entry and the second queue entry; and after the performing the operations, synchronizing the application storage with the remote storage system based on the optimized operations queue.

10. The non-transitory computer-readable device of claim 9, wherein generating the optimized operations queue comprises:

generating the optimized queue entry using a type of the first modification operation.

11. The non-transitory computer-readable device of claim 9, wherein generating the optimized operations queue comprises:

determining that the first queue entry and the second queue entry are associated with the entity;

determining that the first modification operation is a create modification operation; and determining that the second modification operation performs an update operation with respect to the entity.

12. The non-transitory computer-readable device of claim 9, wherein generating the optimized operations queue comprises:

determining that the first modification operation is a first update modification operation with respect to the entity; and determining that the second modification operation performs a second update modification operation with respect to the entity.

13. The non-transitory computer-readable device of claim 9, wherein generating the optimized operations queue comprises:

determining that the first queue entry and the second queue entry are associated with the entity; and determining that the first modification operation and the second modification operation were performed within a transaction based on transaction information within the first queue entry and the second queue entry.

14. The non-transitory computer-readable device of claim 9, wherein generating the optimized operations queue comprises:

generating a third queue entry within the normal operations queue, the third queue entry corresponding to a third modification operation of the plurality of modification operations; and wherein generating the optimized operations queue including the optimized queue entry comprises:

determining that the first queue entry, the second queue entry, and the third queue entry are associated with the entity of the application storage; and generating the optimized queue entry without relying on the third queue entry based on an intervening transaction boundary.

15. The non-transitory computer-readable device of claim 9, the operations further comprising:

generating a third queue entry with a non-modifiable marker within the normal operations queue, the third queue entry corresponding to a third modification operation of the plurality of modification operations; and wherein generating the optimized operations queue including the optimized queue entry comprises:

determining that the first queue entry, the second queue entry, and the third queue entry are associated with the entity; and generating the optimized queue entry without relying on the third queue entry based on the non-modifiable marker.

16. A system, comprising:

a memory including application storage corresponding to a storage system and an original operations queue recording operations executed over the application storage by a client application executing in an offline mode; and one or more processor and/or circuits coupled to the memory and configured to:

perform, by an end-user device and without synchronization of the application storage with a remote storage system, operations comprising:

perform, by the end-user device, a plurality of modification operations over the application storage;

generate, by the end-user device, a first queue entry within the original operations queue, the first queue entry corresponding to a first modification operation of the plurality of modification operations;

generate, by the end-user device, a second queue entry within the first operations queue, the second queue entry corresponding to a second modification operation of the plurality of modification operations;

determine, by the end-user device, an optimization result based on the first queue entry and the second queue entry, the optimization result indicating whether to combine the first queue entry and the second queue entry within an updated operations queue;

in response to a determination that the first queue entry and the second queue entry are associated with an entity of the application storage, generate, by the end-user device, an optimized queue entry combining the first queue entry and the second queue entry, wherein the optimization result comprises the optimized queue entry; and generate the updated operations queue based on the optimization result; and after the performing the operations, synchronize the application storage with the remote storage system based on the optimized operations queue.

17. The system of claim 16, wherein to determine the optimization result, the one or more processor and/or circuits are configured to determine whether the first modification operation and the second modification operation were performed within a transaction based on transaction information within the first queue entry and the second queue entry.

18. The system of claim 16, wherein the optimization result is a first optimization result, and the one or more processor and/or circuits are configured to:

identify a third queue entry within the first operations queue, the third queue entry corresponding to a third modification operation of the plurality of modification operations; and determine a second optimization result based on the first queue entry, the second queue entry, and the third queue entry; and include the third queue entry in the updated operations queue based on the second optimization result.

19. The system of claim 18, wherein to determine the second optimization result, the one or more processor and/or circuits are configured to:

determine that the third queue entry is associated with a non-modifiable marker.

20. The system of claim 18, wherein to determine the second optimization result, the one or more processor and/or circuits are configured to:

identify an intervening queue entry between the second queue entry and the third queue entry, the intervening queue entry being associated with a non-modifiable marker.

21. The method of claim 1, wherein synchronizing the application storage with the remote storage system based on the optimized operations queue comprises:

sending the optimized operations queue to the remote storage system.

22. The system of claim 16, wherein to synchronize the application storage with the remote storage system based on the optimized operations queue, the one or more processor and/or circuits are configured to:

sending the optimized operations queue to the remote storage system.

* * * * *